(12) United States Patent
Wendt et al.

(10) Patent No.: US 10,854,089 B2
(45) Date of Patent: Dec. 1, 2020

(54) METHOD FOR FORMING AND FOR COORDINATING AT LEAST ONE GROUP OF VEHICLES

(71) Applicant: Robert Bosch GmbH, Stuttgart (DE)

(72) Inventors: Hauke Wendt, Ditzingen (DE); Sergey Chirkov, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 8 days.

(21) Appl. No.: 16/178,385

(22) Filed: Nov. 1, 2018

(65) Prior Publication Data

US 2019/0139419 A1    May 9, 2019

(30) Foreign Application Priority Data

Nov. 6, 2017  (DE) ........................ 10 2017 219 665

(51) Int. Cl.
| | | |
|---|---|---|
| *G08G 1/00* | (2006.01) | |
| *G05D 1/00* | (2006.01) | |
| *G05D 1/02* | (2020.01) | |

(52) U.S. Cl.
CPC ............. *G08G 1/22* (2013.01); *G05D 1/0088* (2013.01); *G05D 1/0293* (2013.01)

(58) Field of Classification Search
CPC ....... G08G 1/22; G05D 1/0088; G05D 1/0293
USPC .......................................................... 701/23
See application file for complete search history.

(56) References Cited

U.S. PATENT DOCUMENTS

| | | | | |
|---|---|---|---|---|
| 4,167,784 A | * | 9/1979 | McReynolds .......... | G08G 1/082 340/911 |
| 4,167,785 A | * | 9/1979 | McReynolds .......... | G08G 1/082 340/911 |
| RE31,044 E | * | 9/1982 | McReynolds .......... | G08G 1/082 340/913 |
| 7,860,639 B2 | * | 12/2010 | Yang ...................... | G08G 1/081 701/117 |
| 9,632,507 B1 | * | 4/2017 | Korn ....................... | G08G 1/22 |
| 9,671,500 B1 | * | 6/2017 | Hay ........................ | G01S 19/07 |
| 10,068,485 B2 | * | 9/2018 | Dudar ................. | B60W 30/165 |
| 10,073,464 B2 | * | 9/2018 | Pilkington ............ | G05D 1/0293 |
| 10,152,064 B2 | * | 12/2018 | Switkes ................. | G05D 1/0278 |
| 10,220,768 B2 | * | 3/2019 | Damon .................. | F21S 43/31 |
| 10,234,859 B2 | * | 3/2019 | Lokesh .................. | G01S 19/51 |
| 10,254,764 B2 | * | 4/2019 | Laubinger ............. | G05D 1/0272 |
| 10,259,456 B2 | * | 4/2019 | Park ....................... | G08G 1/22 |

(Continued)

FOREIGN PATENT DOCUMENTS

| | | |
|---|---|---|
| DE | 102012021282 A1 | 4/2014 |
| DE | 112014005122 T5 | 8/2016 |
| WO | WO2011125185 A1 * | 4/2010 |

OTHER PUBLICATIONS

Google translation of WO2011125185A1 (Apr. 7, 2010).*

*Primary Examiner* — Jean Paul Cass

(74) *Attorney, Agent, or Firm* — Norton Rose Fulbright US LLP; Gerard Messina

(57) ABSTRACT

A method for forming and coordinating a group of autonomous or semi-autonomous vehicles includes a potential platoon vehicle transmitting a coupling inquiry for coupling to a vehicle present in its surroundings to form or modify a vehicle group, establishing or ascertaining a platoon coordination vehicle, which checks whether a conflict exists, and, after the conflict has been resolved or in the absence of the conflict, forming or modifying the group of vehicles.

10 Claims, 1 Drawing Sheet

(56) References Cited

U.S. PATENT DOCUMENTS

| | | | |
|---|---|---|---|
| 10,262,542 B2* | 4/2019 | Brooks | B61L 27/04 |
| 10,369,998 B2* | 8/2019 | Kuszmaul | G08G 1/22 |
| 10,372,123 B2* | 8/2019 | Cremona | G05D 1/0027 |
| 10,449,962 B2* | 10/2019 | Saigusa | B60W 50/04 |
| 10,474,166 B2* | 11/2019 | Switkes | G05D 1/0293 |
| 10,482,767 B2* | 11/2019 | Miller, Jr. | B60W 30/165 |
| 2010/0256835 A1 | 10/2010 | Mudalige | |
| 2014/0316865 A1* | 10/2014 | Okamoto | G05D 1/0293 |
| | | | 705/14.1 |
| 2017/0053530 A1* | 2/2017 | Gogic | H04L 67/12 |
| 2017/0320481 A1* | 11/2017 | Johannesson Mardh | |
| | | | B60W 20/12 |
| 2018/0188745 A1* | 7/2018 | Pilkington | G08G 1/22 |
| 2018/0348791 A1* | 12/2018 | Hendrickson | F01N 9/00 |
| 2019/0139419 A1* | 5/2019 | Wendt | G05D 1/0088 |

* cited by examiner

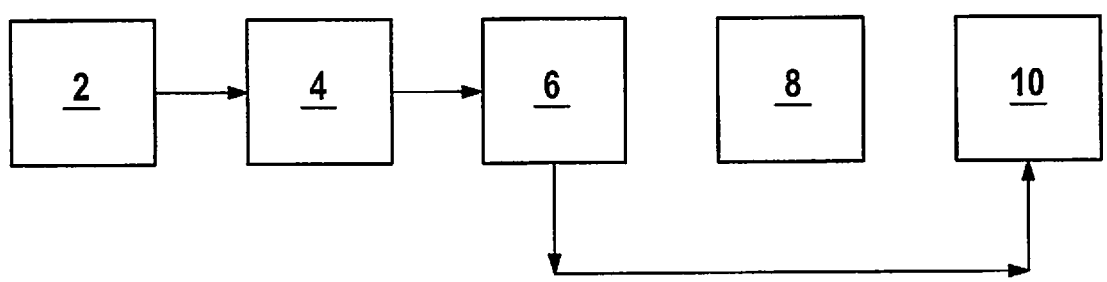

METHOD FOR FORMING AND FOR COORDINATING AT LEAST ONE GROUP OF VEHICLES

CROSS-REFERENCE TO RELATED APPLICATIONS

The present application claims priority under 35 U.S.C. § 119 to DE 10 2017 219 665.3, filed in the Federal Republic of Germany on Nov. 6, 2017, the content of which is hereby incorporated by reference herein in its entirety.

FIELD OF THE INVENTION

The present invention relates to a method for forming and for coordinating at least one group of vehicles, including at least two autonomous or semi-autonomous vehicles.

BACKGROUND

To make the fuel consumption of commercial vehicles more economical and environmentally friendly, manufacturers at present are working on approaches for a so-called "platooning" or grouping of multiple commercial vehicles into a group of vehicles. For this purpose, multiple commercial vehicles, such as trucks, drive in an electronically coupled manner closely behind a lead vehicle to benefit from the slipstream of the preceding vehicles and be able to save fuel.

Forming a group of vehicles, however, is problematic with a random distribution of potential platoon vehicles and other non-platoon-capable vehicles therebetween.

SUMMARY

Example embodiments of the present invention provide an efficient and dynamic method for forming and for managing a group of vehicles.

According to an example embodiment of the present invention, a method for forming and for coordinating at least one group of vehicles, including at least two autonomous or semi-autonomous vehicles, is provided. A coupling inquiry is transmitted by a potential platoon vehicle or by a platoon coordination vehicle of a group of vehicles to at least one vehicle or group of vehicles present in its surroundings. Thereafter, at least one platoon coordination vehicle is established or ascertained. The at least one platoon coordination vehicle checks whether a conflict exists with the transmitted coupling inquiry. After the conflict has been resolved or in the absence of the conflict, the potential platoon vehicle or the group of vehicles, together with the at least one vehicle or group of vehicles situated in its surroundings, forms a shared group of vehicles.

As a result of the method, the vehicles are able to effectively and dynamically form a group or a group of vehicles with one another and manage and adapt it if changes occur.

A potential platoon vehicle is a platoon-capable vehicle, which is able to drive autonomously or semi-autonomously in a group of vehicles and is able to carry out appropriate driving maneuvers for forming and for joining a group of vehicles.

A potential platoon vehicle can determine the distances from the respective next vehicle ahead of and behind it in advance and ascertain whether these vehicles are platoon-capable. Such vehicles are also potential platoon vehicles. A platoon formation inquiry or coupling inquiry is transmitted to the next potential platoon vehicle. If no conflict exists and the potential platoon vehicle is ready to form a group of vehicles, the inquiry is confirmed in the affirmative, and the group of vehicles is formed.

A potential platoon vehicle, for example the first vehicle, assumes the role of the platoon coordination vehicle. It would also be possible to use multiple coordinators. By way of example, the use of a single coordinator is described here, this role also being assumed by the first vehicle by way of example. The platoon coordination vehicle can representatively manage and coordinate the coupled platoon users or platoon vehicles, in particular with respect to a coupling of potential platoon vehicles and decoupling of platoon vehicles.

For the coordination, data can be used, for example, such as a number of platoon vehicles, a length of the respective platoon vehicles, a position of the respective platoon vehicles within the group of vehicles, actual distances between the platoon vehicles and identification numbers for an unambiguous communication. In particular, the platoon coordination vehicle has to know the actual end of the group of vehicles to be able to correctly handle coupling inquiries to the rear.

If individual potential platoon vehicles couple to an existing group of vehicles, the method for forming a group of vehicles can be analogously applied for coupling two potential platoon vehicles in pairs. The platoon coordination vehicle can representatively assume the coordination for the group of vehicles.

Furthermore, the method can be used to couple multiple groups of vehicles to one another to form a large shared group of vehicles. The respective platoon coordination vehicles can communicate with one another with respect to the formation of a shared group of vehicles.

According to one exemplary embodiment of the method, a conflict exists in the case of multiple simultaneous coupling inquiries, the conflict being resolved by arbitration of the coupling inquiries. If a potential platoon vehicle or a platoon coordination vehicle receives multiple coupling inquiries simultaneously, the respective vehicle or a control unit of the vehicle has to decide in what order the coupling inquiries will be processed. This can be the case, for example, when a preceding potential platoon vehicle and a following potential platoon vehicle simultaneously transmit a coupling inquiry to a potential platoon vehicle. The arbitration can be carried out, for example, by an arbiter circuit for establishing an order for processing the inquiries.

According to one further exemplary embodiment of the method, the arbitration of the coupling inquiries is carried out based on a distance between the at least one potential platoon vehicle and the at least one platoon coordination vehicle or at least the front or rear boundary of the group of vehicles. Regardless of whether the conflict occurs with an individual potential platoon vehicle or a group of vehicles, the distance can represent an optimal criterion for determining an order in which to process the coupling inquiries. In particular, potential platoon vehicles which are positioned more closely to another potential platoon vehicle or a group of vehicles can be integrated more quickly into a shared group of vehicles. The distance can be a distance between a preceding potential platoon vehicle and a front boundary of the group of vehicles, or from a first platoon vehicle. As an alternative or in addition, a distance between a potential platoon vehicle driving behind the group of vehicles and the last platoon vehicle or the rear boundary of the group of vehicles can be used for carrying out the arbitration.

According to one further exemplary embodiment of the method, the arbitration of the coupling inquiries is carried out randomly by the at least one platoon coordination vehicle. If, during the arbitration, the inquiring potential platoon vehicles should have an identical distance from the inquired vehicle, further secondary parameters can be used to determine an order. This can be a size of a potential platoon vehicle or its speed, for example. Alternatively, the order can be determined randomly. In this way, a technically simple arbitration can be carried out.

According to one further exemplary embodiment of the method, at least one potential platoon vehicle is placed in a waiting loop in the event of a conflict. In the case of multiple coupling inquiries for forming a shared group of vehicles, an approval can be issued, for example in the absence of conflicts, so that this vehicle can initiate a coupling maneuver for forming the shared group of vehicles. The remaining potential platoon vehicles can be placed in a so-called "hold" state. This can take place, for example, in the form of a waiting loop. This can mean, for example, that the transmitted coupling inquiries are answered within a short time. For this purpose, the forming group of vehicles, before it is able to actually answer a further coupling inquiry, has to ensure an unambiguous coordination by an ascertained or assigned platoon coordination vehicle. Thereafter, the still outstanding coupling inquiries can be evaluated and processed by the platoon coordination vehicle of the formed group of vehicles.

The platoon coordination vehicle can evaluate the coupling options for further vehicles. In particular, a maximum length of the group of vehicles can be taken into consideration and, based thereon, a coupling can be allowed or refused. A subsequent answer of a potential platoon vehicle should include an identification of the original inquiry since the answering user or the potential platoon vehicle has changed. By placing the inquiring potential platoon vehicles in a waiting loop, the coupling process can be initiated at an optimized point in time so that, for example, unnecessary distance changes and associated braking maneuvers and acceleration maneuvers can be avoided.

According to one further exemplary embodiment of the method, in the event of a conflict, at least one potential platoon vehicle transmits another coupling inquiry after a waiting period. As an alternative to placing potential platoon vehicles in a waiting loop, direct feedback can be provided by a platoon coordination vehicle to inquiring potential platoon vehicles that a coupling can only be tried again after a defined time period. In this way, the platoon coordination vehicle can be intermittently relieved.

According to one further exemplary embodiment of the method, a coupling inquiry is forwarded to the at least one platoon coordination vehicle directly or by at least one platoon vehicle. Preferably, a potential platoon vehicle can transmit its coupling inquiry directly to the platoon coordination vehicle. In particular in the case of longer groups of vehicles, a direct coupling inquiry might not be possible due to a large distance between the potential platoon vehicle and the platoon coordination vehicle. The coupling inquiries can thus be transmitted to a first or to a last platoon vehicle of the group of vehicles. These platoon vehicles can subsequently forward the inquiry to the platoon coordination vehicle. An answer of the platoon coordination vehicle can also be forwarded by other platoon vehicles of the group of vehicles, all the way to the addressee or the inquiring potential platoon vehicle. As an alternative, individual platoon vehicles can serve as a gateway or a repeater of the platoon coordination vehicle.

According to one further exemplary embodiment of the method, a coupling inquiry is carried out by a vehicle-to-vehicle communication link. In this way, the formation and the coordination of the group of vehicles can be carried out solely on a wireless car-to-car communication. The communication can be a WLAN, a UMTS, a radio link, an LTE connection or the like, for example.

According to one further exemplary embodiment of the method, a conflict exists when a maximum number of platoon vehicles has been reached in a group of vehicles, the conflict being resolved by declining the at least one coupling inquiry or by dividing the at least one group of vehicles. Usually, a size of the group of vehicles is limited by a maximum permissible size or by a maximum size of the group of vehicles. This limitation can either depend on a maximum number of platoon vehicles or on a maximum length of the group of vehicles. Coupling inquiries from potential platoon vehicles or couplings from potential platoon vehicles into the group of vehicles can thus be approved as long as the maximum size of the group of vehicle has not been reached. When a maximum size has been reached, incoming coupling inquiries are answered in the negative or declined.

If there is a coupling inquiry from one group of vehicles to another group of vehicles, the resulting size of a shared group of vehicles is crucial. If this resulting size is greater than the maximum size, a conflict exists. This conflict can be resolved, for example, by declining the coupling inquiry. Both groups of vehicles remain in existence unchanged. As an alternative, the conflict can be resolved in that one group of vehicles is dissolved, and the platoon vehicles join the inquired group of vehicles up to the maximum size. For example, a smaller group of vehicles can be divided for the benefit of a larger group of vehicles. The remaining platoon vehicles of the dissolved group of vehicles can subsequently themselves couple to a group of vehicles or join another group of vehicles.

According to one further exemplary embodiment of the method, the group of vehicles is reduced when at least one platoon vehicle withdraws from the group or vehicles, or it is divided into at least two groups of vehicles. This can take place as a function of a position of the platoon vehicle in the group of vehicles, for example. If, for example, the last platoon vehicle exits, the last platoon vehicle checks out with the platoon coordination vehicle and leaves the group of vehicles. Just before the actual exit, the platoon coordination vehicle would set coupling inquiries to a "hold" state, for example. Upon the withdrawal of the platoon vehicle, the platoon coordination vehicle deletes the data or pieces of information of the formerly last platoon vehicle. Thereafter, the coupling inquiry can be answered in the affirmative, and the potential platoon vehicle can be integrated into the group of vehicles.

If a platoon vehicle exits from the center of the group of vehicles, the corresponding platoon vehicle checks out with the platoon coordination vehicle and leaves the group of vehicles, for example at an exit ramp. There are two possible procedures here. For example, the group of vehicles can divide into two groups of vehicles or re-form. The platoon coordination vehicle can remain unchanged by its newly formed portion of the group of vehicles, a new platoon coordination vehicle being ascertained or defined in the second portion of the group of vehicles. As an alternative, the data of the platoon vehicle, after an outcoupling thereof, can be deleted by the platoon coordination vehicle, and the order of the platoon vehicles can be re-sorted. In this way, the group of vehicles can remain in existence, and following platoon vehicles can fill the resulting gap.

According to one further embodiment of the method, pieces of information of the group of vehicles are stored by each platoon vehicle or only by the platoon coordination vehicle. In this way, the storage and provision of the pieces of information about the group of vehicles can take place centrally by the platoon coordination vehicle or decentrally by all platoon vehicles.

In the central provision of the data or pieces of information, only the platoon coordination vehicle has the data required for the coordination. In the case of a division of the group of vehicles, all pieces of information thus have to be transmitted to a new platoon coordination vehicle. The information of the vehicles leaving the group of vehicles is not transmitted.

In the decentral provision of the data or pieces of information, each platoon vehicle includes all pieces of information relevant for managing the group of vehicles. These are, in particular, the identification numbers of the platoon vehicles, the order and the lengths of the platoon vehicles. When a group of vehicles is divided, it is not necessary to first transmit the data to a new platoon coordination vehicle, since it already has these pieces of information available. Only the data of the users or platoon vehicles that no longer belong to the group of vehicles have to be deleted. In this way, a method for coordinating at least one group of vehicle which is robust with respect to intermittent disruptions in the communication can be implemented.

According to one further exemplary embodiment of the method, an infrastructure of the vehicle surroundings is used for coordinating the at least one shared group of vehicles, coupling inquiries being transmitted to the infrastructure of the vehicle surroundings. In this way, the method described here can, alternatively or additionally, implement a coordination and formation of a group of vehicles by interacting with a traffic infrastructure via a Car-to-X communication link. If, for example, the data of the group of vehicles are stored in the group of vehicles in accordance with the method described here, the platoon vehicles can seamlessly assume the control, and in particular the coordination, in the event of infrastructure gaps or failure of the infrastructure.

One preferred exemplary embodiment of the present invention is described in greater detail hereafter based on a highly simplified schematic representation.

BRIEF DESCRIPTION OF THE DRAWING

The FIGURE is a flowchart of a method according to an example embodiment of the present invention.

DETAILED DESCRIPTION

The flowchart of the FIGURE illustrates a method 1 for forming and coordinating at least one group of vehicles according to an example embodiment. In a first step, a potential platoon vehicle transmits 2 a coupling inquiry to a vehicle situated in its surroundings. The vehicle receiving the coupling inquiry is established 4 here as a platoon coordination vehicle. In this way, the platoon coordination vehicle is able to assume all further management tasks. The platoon coordination vehicle now checks whether conflicts exist 6 in connection with the coupling inquiry. According to the exemplary embodiment, no conflicts exist, so that a conflict resolution 8 is skipped, and the two vehicles form 10 a shared group of vehicles.

What is claimed is:

1. A method for forming and coordinating a group of autonomous or semi-autonomous vehicles, the method comprising:
    transmitting, by a first vehicle, a coupling inquiry requesting coupling with a second vehicle that is present in surroundings of the first vehicle;
    establishing or ascertaining a platoon coordination vehicle;
    checking, by the platoon coordination vehicle, whether there is a conflict in the coupling of the first vehicle to the second vehicle;
    coupling, after the conflict has been resolved or in absence of the conflict, the first vehicle to the second vehicle to form or modify the group;
    placing, during presence of the conflict, the first vehicle in a waiting loop and/or providing direct feedback by a platoon coordination vehicle to an inquiring potential platoon vehicle that a coupling can only be tried again after a defined time period; and
    transmitting, after the checking, in which presence of the conflict is determined, from the first vehicle another coupling inquiry after passage of a waiting period;
    wherein the conflict is determined to exist when multiple simultaneous coupling inquiries are transmitted, and the conflict is resolved by arbitration of the coupling inquiries,
    wherein the arbitration of the coupling inquiries is carried out based on a distance between (a) the first vehicle and (b) the platoon coordination vehicle, a front boundary of the group, or a rear boundary of the group,
    wherein the conflict exists when a maximum number of platoon vehicles is reached in the group, and the conflict is resolved by declining another coupling inquiry, and
    wherein the platoon coordination vehicle stores information regarding the vehicles of the group that other vehicles of the group do not store.

2. The method of claim 1, wherein the arbitration of the coupling inquiries includes selecting one of the inquiries arbitrarily.

3. The method of claim 1, wherein the transmission of the coupling inquiry is made directly to the platoon coordination vehicle.

4. The method of claim 1, wherein the transmission of the coupling inquiry is made directly to a first vehicle of the group, which forwards the coupling inquiry to the platoon coordination vehicle.

5. The method of claim 1, wherein the coupling inquiry is transmitted using a vehicle-to-vehicle communication link.

6. The method of claim 1, wherein the conflict exists when a maximum number of platoon vehicles is reached in the group, and the conflict is resolved by dividing the group.

7. The method of claim 1, wherein the group is reduced when at least one vehicle withdraws from the group.

8. The method of claim 1, wherein the group is reduced when the group is divided into at least two groups of vehicles.

9. The method of claim 1, wherein each of the vehicles of the group stores information regarding the vehicles of the group.

10. The method of claim 1, wherein an infrastructure of the vehicle surroundings is used for coordinating the group, and the transmission of the coupling inquiry is to the infrastructure.

* * * * *